United States Patent
Chang

(10) Patent No.: US 6,661,541 B1
(45) Date of Patent: Dec. 9, 2003

(54) CLOSED CIRCUIT CONTROL DEVICE FOR SCANNER

(75) Inventor: Tsanghuai Chang, Yuanlin (TW)

(73) Assignee: Umax Data Systems, Inc., Hsinchu (TW)

( * ) Notice: Subject to any disclaimer, the term of this patent is extended or adjusted under 35 U.S.C. 154(b) by 0 days.

(21) Appl. No.: 09/543,006

(22) Filed: Apr. 4, 2000

(51) Int. Cl.⁷ .................................................. H04N 1/04
(52) U.S. Cl. ........................................ 358/474; 358/505
(58) Field of Search ................................ 358/474, 497, 358/496, 505, 513, 1.5, 482, 483

(56) References Cited

U.S. PATENT DOCUMENTS 5,278,659 A * 1/1994 Araki .................... 358/213.19
5,963,343 A * 10/1999 Kubo .......................... 358/473

* cited by examiner

*Primary Examiner*—Jerome Grant, II
*Assistant Examiner*—Negussie Worku
(74) *Attorney, Agent, or Firm*—J.C. Patents

(57) ABSTRACT

A closed circuit control device for controlling carrier speed of a scanner. An optical meter is attached to the transparent glass panel of a scanner such that an image of the optical meter is formed on an optical sensor such as a charge couple device or a contact image sensor. Image of the optical meter is converted into sense signals by the optical sensor so that speed of the carrier can be accurately computed. Through the acquisition of an accurate carrier speed, scanning speed and direction can be precisely controlled.

12 Claims, 3 Drawing Sheets

CLOSED CIRCUIT CONTROL DEVICE FOR SCANNER

BACKGROUND OF THE INVENTION

1. Field of Invention

The present invention relates to a closed circuit control device for a scanner. More particularly, the present invention relates to a closed circuit control device that utilizes an optical meter.

2. Description of Related Art

In general, optical scanners can have two main modes of operation, namely, reflective scanning and transparency scanning. In reflective scanning, a document (the document is non-transparent) is placed on top of a transparent glass panel, and then light from a light source shines through the transparent glass panel and reflects back from the document. After passing through a set of optical lenses, the reflected light enters an optical sensor such as a charge couple device (CCD) or a contact image sensor (CIS). Ultimately, a scan image is formed. In transparency scanning, a document (the document can be a film negative or a transparency for projector) is also placed on top of a transparent glass panel. However, light from a light source has to shine through the document first. After going through the transparent glass panel, the light passes through a set of optical lenses and finally enters the optical sensor to produce a scan image.

FIG. 1 is a schematic cross-sectional side view of a conventional scanning system. To scan a non-transparent document 40, a reflective scanning system is used. A light source 38 inside a sensor box 30 emits a light ray that passes through a transparent glass panel 20. The ray of light is directed at the document 40 and then reflected back through the narrow crevice 34 into the sensor box 30. After passing through an optical system 36 (detailed structure not shown), the reflected light is transmitted to an optical sensor 32 (CCD or CIS). The optical sensor 32 then transforms the incoming light into optical data for subsequent image production, thereby completing one scanning operation. Thereafter, the sensor box 30 steps forward along the transparent glass panel to carry out more scanning operations until everything on the document 40 has been reflected and converted into image data. All through the reflective scanning operation, a light source carrier 10 located above the transparent glass panel 20 remains idle.

To carry out the scanning of a transparent document 40, a light source inside the light source carrier 10 emits a light ray that passes through a crevice 14. The light beam passes through the document 40 and the transparent glass panel 20 and then enters the sensor box 30 through its crevice 34. Similarly, the light is transmitted to the optical sensor 32 after going through the optical system 36 (detail structure not shown). The optical sensor 32 then transforms the incoming light into optical data for subsequent image production, thereby completing one scanning operation. Thereafter, the light source carrier 10 and the sensor box 30 step forward in synchrony along the transparent glass panel 20 to carry out more scanning operations until everything on the document 40 has been converted into image data. All through the transparency scanning operation, the light source 38 inside the sensor box 30 produces no light.

In a conventional scanner, whether the scanning is in reflective or transparency mode, the light source carrier and the sensor box are driven by a motor. In general, control of the motor is difficult, leading to some jerkiness of motion, that is, sometimes faster and sometimes slower. Such discontinuous motion may lead to some discontinuity in the extraction of image data and ultimately may lead to some distortion of the scanned image.

To resolve the driving problem, sensors are often installed inside a conventional scanner for monitoring the speed of carriers so that feedback signals are returned to the motor. However, the installation of sensors complicates the control circuit and increases production cost.

SUMMARY OF THE INVENTION

Accordingly, one object of the present invention is to provide a closed circuit control device for a scanner. The device has an optical meter attached to the transparent glass panel of a scanner. During scanning, images of the black and white strips on the optical meter are formed on an optical sensor such as CCD or CIS so that an output signal is generated. The output signal is used for processing and computation, and hence scanning speed and direction of the scanner is under control.

A second object of the invention is to provide a closed circuit control device for a scanner. The device uses an optical sensor such as CCD or CIS instead of a conventional motor control sensor for controlling scanning speed and direction. Hence, production cost is lowered and circuit design is simplified.

A third object of the invention is to provide a closed circuit control device for a scanner. A plurality of optical meters is attached to the transparent glass panel of the scanner so that the optical sensor within the scanner is able to receive signals during scanning. Hence, motion of the carriers inside the scanner is under proper control.

To achieve these and other advantages and in accordance with the purpose of the invention, as embodied and broadly described herein, the invention provides a closed circuit control method for controlling a scanner. In the scanning mode, an optical meter produces an image on an optical sensor. The image is transformed into sense signals, and then the sense signals are transferred to a computational device where motion of the carriers is determined. Later, speed of carriers is compared with a preset speed. If the speed of carriers is greater than the preset speed, motor speed is reduced. On the other hand, if the speed of carriers is less than the preset speed, motor speed is increased. When the carriers are running at the exact preset speed, the motor speed is maintained.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
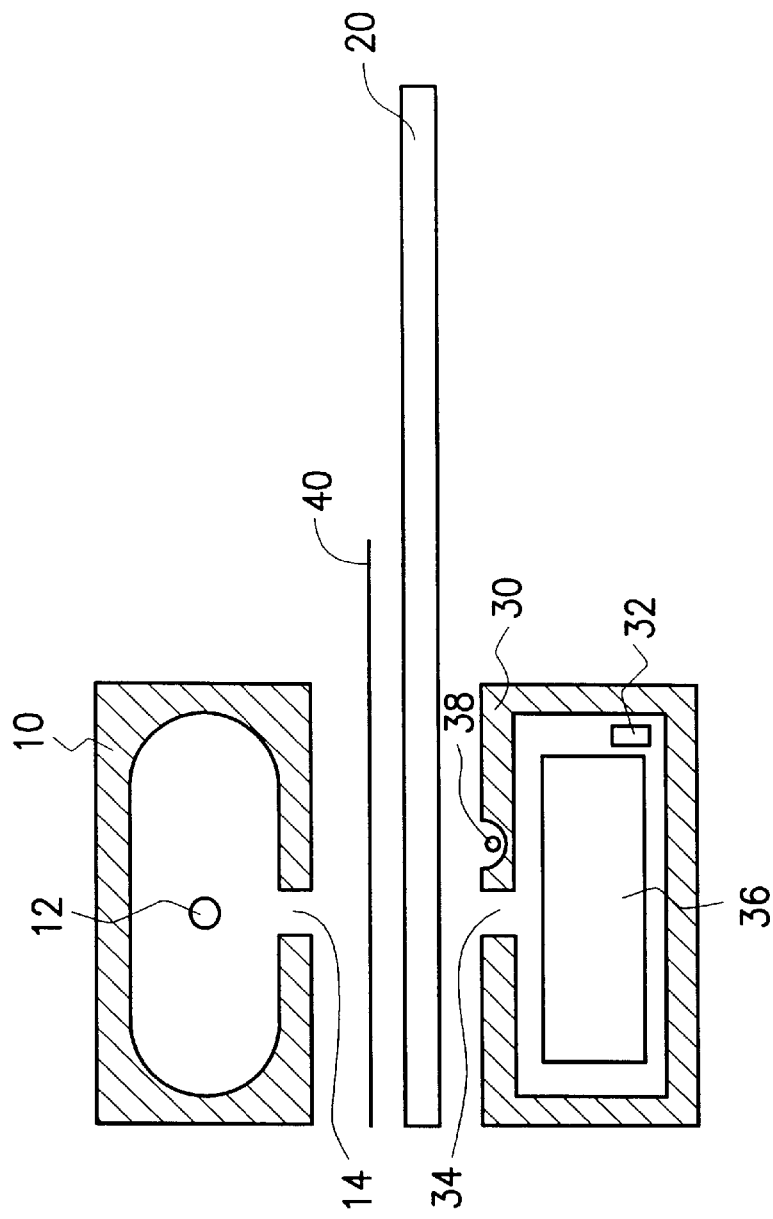
FIG. 1 is a schematic cross-sectional side view of a conventional scanning system.

Reference will now be made in detail to the present preferred embodiments of the invention, examples of which are illustrated in the accompanying drawings. Wherever possible, the same reference numbers are used in the drawings and the description to refer to the same or like parts.

Figure 2:
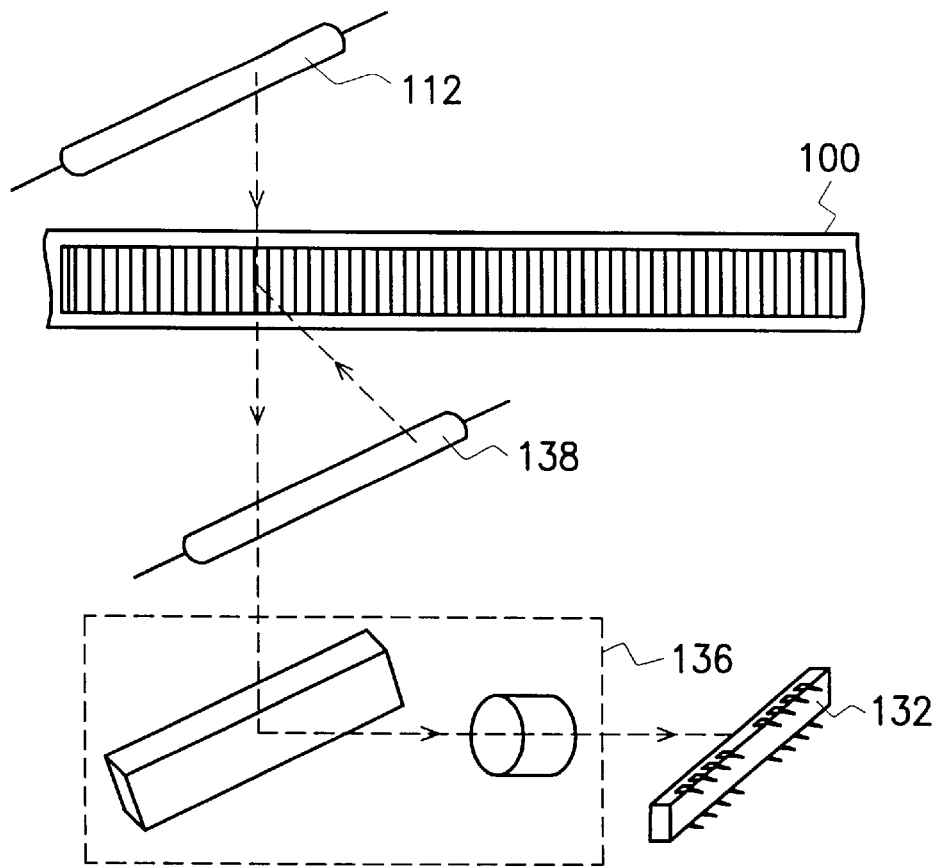
FIG. 2 is a sketch of the closed circuit control device of a scanner according to this invention.

FIG. 2 is a sketch of the closed circuit control device of a scanner according to this invention. The main difference between a conventional scanner and the scanner of this invention is the installation of an optical meter 100 on a transparent glass panel (not shown). The optical meter 100 has a large number of alternating black and white strips.

To scan a non-transparent document (not shown), the scanner operates in a reflective scanning mode. A light source 138 under the transparent glass panel emits a light ray. The light ray passes through the transparent glass panel and reaches both the document and the optical meter 100. Light rays are reflected back from both the document and the optical meter 100. The reflected rays pass through an optical system 136 and arrive at an optical sensor 132 (a CCD or a CIS), thereby forming images of both the document and the optical meter 100. The images are transformed inside the optical sensor 132 to form image data. In this invention, image data obtained from the optical meter are used as signals for controlling the scanning speed and direction of the scanner.

Figure 3A:
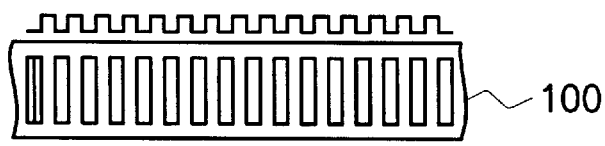
FIG. 3A is a sketch of the optical meter according to a first preferred embodiment of this invention.

FIG. 3A is a sketch of the optical meter according to a first preferred embodiment of this invention. As shown in FIG. 3A, the optical meter 100 has a large number of alternating black and white strips. The carriers of the scanner are driven to advance by a motor. Hence, the reflected light from the optical meter 100 generates alternating black and white signals at the optical sensor. If bright light at the sensor represents a high potential (or logic '1') and dim light at the sensor represents a low potential (or logic '0'), a digital pattern of '1' and '0' is produced. Since the rate of generation of digital data depends on speed of the carriers, speed of the driving motor can be computed. Hence, driving speed of the motor can be increased or decreased accordingly.

Figure 3B:
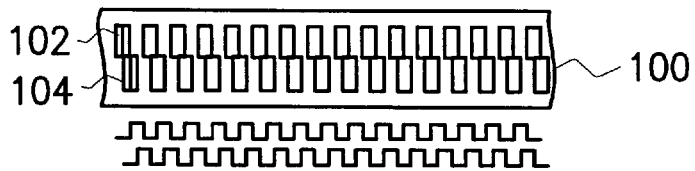
FIG. 3B is a sketch of the optical meter according to a second preferred embodiment of this invention.

FIG. 3B is a sketch of the optical meter according to a second preferred embodiment of this invention. As shown in FIG. 3B, the optical meter 100 has two bands of alternating black and white strips. Each band has its own pattern arrangement. In this embodiment, the black and white strips in both the first band and the second band have the same width. In addition, the first band 102 is shifted by half the width of a strip with respect to the second band 104. Light reflected from the optical meter 100 is transferred to the optical sensor. Since the optical meter 100 is attached to the carrier of the scanner, a digital pattern is produced when the carrier is driven by a motor.

When the carrier advances forward, the optical sensor picks up a sequence of digital signals having the pattern '10', '11', '01' and '00', cyclically. Conversely, when the carrier moves backward, the optical sensor will picks up a sequence of digital signals having the pattern '00', '01', '11' and '10', cyclically. Hence, the direction of movement of the carrier is absolutely determined just by observing the digital signal sequence obtained from the optical sensor. In other words, besides controlling the running speed of the motor, the black and white signals generated by the optical meter are further capable of detecting direction of motion.

The optical meter described in the first and the second embodiment of this invention can be used in scanning both reflective document scanning and transparent document scanning. For example, the optical meter can be attached to the transparent glass panel facing the sensor carrier to carry out reflective scanning. On the other hand, the optical meter can be attached to the transparent glass panel facing the light source carrier to carry out a transparency scanning. The only criterion for installing the optical meters is that they must not overlap.

Figure 4:
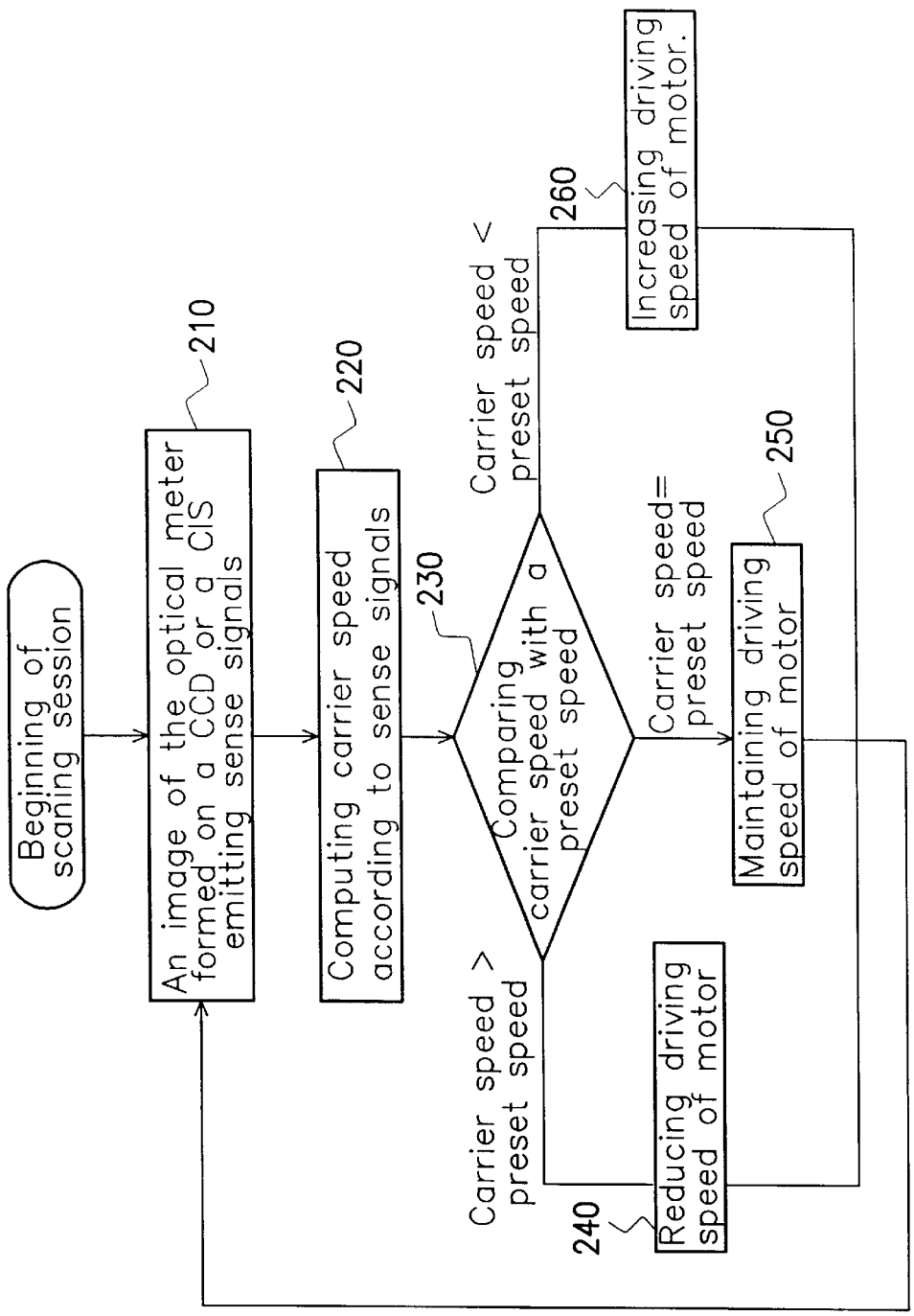
FIG. 4 is a flow chart showing the steps in the closed circuit control of the scanner of this invention.

FIG. 4 is a flow chart showing the steps in the closed circuit control of the scanner of this invention. After the start of a scanning session, an image of the optical meter is formed in an optical sensor such as a CCD or a CIS, and then image data is transformed into sense signals (in step 210). Speed of the carrier is computed according to the rate of production of the alternating high/low sense signals (in step 220). A comparison between the computed speed of the carrier and the preset speed is next carried out (in step 230). If the computed speed is higher than the preset speed, driving speed of the motor is reduced (in step 240). If the computed speed is lower than the preset speed, driving speed of the motor is increased (in step 260). However, if the computed speed matches the preset speed, driving speed of the motor is maintained (in step 250).

In summary, this invention provides a closed circuit control device for a scanner. The device has an optical meter attached to the transparent glass panel of a scanner. During scanning, images of the black and white strips on the optical meter are formed on an optical sensor such as CCD or CIS so that an output signal is generated. The output signal is used as a means for controlling the scanning speed and direction of the scanner.

The invention also provides a closed circuit control device that uses an optical sensor such as CCD or CIS instead of a conventional motor control sensor for controlling scanning speed and direction. Hence, production cost is lowered and circuit design is simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A closed circuit control device for controlling the scanning speed of a plurality of carriers inside a scanner, comprising:

a plurality of optical meters attached to a transparent glass panel and an optical sensor inside the scanner, wherein at least two of the optical meters are overlapped to produce digital signals with a cyclical directional pattern, whereby the optical scanner is capable of continuously picking up images of the optical meters during a scanning session and generating corresponding sense signals for controlling speed of a plurality of carriers, and detecting a moving direction according to the cyclical directional pattern.

2. The device of claim 1, wherein each optical meter has a pattern of alternating black and white strips thereon.

3. The device of claim 1, wherein each optical meter includes a plurality of bands with each band having a pattern of alternating black and white strips thereon.

4. The device of claim 3, wherein between a center of a white strip and a center of a black strip in a black and white band lies a black strip or a white strip of another black and white band.

5. The device of claim 1, wherein the optical sensor includes a charge couple device (CCD).

6. The device of claim 1, wherein the optical sensor includes a contact image sensor (CIS).

7. A closed circuit control method for controlling the carrier of a scanner, comprising:

forming an image of an optical meter attached to the carrier in an optical sensor and converting the image into sense signals;

transmitting the sense signals to a computational device for converting frequency of a sense signal to a carrier speed;

comparing a computed carrier speed with a preset speed;

reducing speed of a driving motor if the computed carrier speed is greater than the preset speed;

increasing speed of the driving motor if the computed carrier speed is smaller than the preset speed; and maintaining speed of the driving motor if the computed carrier speed and the preset speed are identical.

8. The method of claim 7, wherein each optical meter includes a pattern of alternating black and white strips thereon.

9. The method of claim 7, wherein each optical meter includes a plurality of bands with each band having a pattern of alternating black and white strips thereon.

10. The method of claim 9, wherein between a center of a white strip and a center of a black strip in a black and white band lies a black strip or a white strip of another black and white band.

11. The method of claim 7, wherein the optical sensor includes a charge couple device (CCD).

12. The method of claim 7, wherein the optical sensor includes a contact image sensor (CIS).

* * * * *